No. 720,451. PATENTED FEB. 10, 1903.
L. W. LUELLEN.
FASTENER.
APPLICATION FILED AUG. 23, 1902.

NO MODEL.

WITNESSES.
William L. Clark.
Chas. A. Clark.

INVENTOR.
LAWRENCE W. LUELLEN.
BY
ATTORNEY.

UNITED STATES PATENT OFFICE.

LAWRENCE W. LUELLEN, OF BROOKLINE, MASSACHUSETTS.

FASTENER.

SPECIFICATION forming part of Letters Patent No. 720,451, dated February 10, 1903.

Application filed August 23, 1902. Serial No. 120,773. (No model.)

*To all whom it may concern:*

Be it known that I, LAWRENCE W. LUELLEN, a citizen of the United States, residing at Brookline, in the county of Norfolk and State of Massachusetts, have invented a new and useful Improvement in Fasteners, of which the following is a specification.

My invention relates to devices for attaching various elements together, being more particularly adapted for fastening portions of garments and the like.

It has for its principal objects the provision of such a device which may be readily fastened and unfastened by the wearer, but which will be secure against accidental separation.

Figure 1:
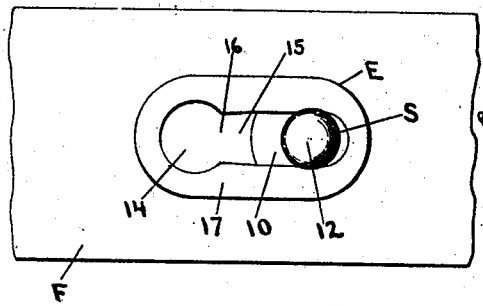
Figure 2:
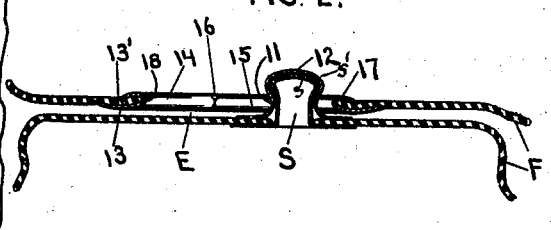
Figure 3:
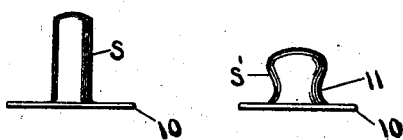
Figure 4:
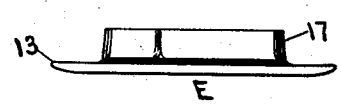
Figure 5:
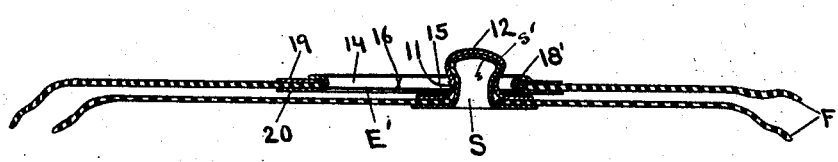

In the accompanying drawings, Figure 1 is a top plan view of one embodiment of my invention applied to the fastening together of two pieces of fabric. Fig. 2 is a central vertical longitudinal section therethrough. Figs. 3 and 4 are respectively side elevations of the stud member and eyelet member before they are applied, the sections of the former being shown separated; and Fig. 5 is a central vertical longitudinal section through another form of my fastener.

Similar characters indicate like parts throughout the several figures of the drawings.

The letter S designates a stud member, more essentially consisting of a securing plate or plates 10, from which extends a shank 11, terminating in an enlarged head 12. As here illustrated, this stud is made up of inner and outer sections s s', respectively, each having one of the flanges 10 to bear against opposite sides of the element to which it is to be secured, the inner section being expanded under pressure to the form shown in Fig. 2 when the stud is applied to retain it in place.

The letter E designates an eyelet member which consists of a plate 13, preferably somewhat concaved at 13' and provided with the eyelet-opening, of which one portion 14 is sufficiently large to admit the head 12 of the stud, while from this extends a narrower, preferably elongated, portion or slot 15 of such width as to permit the passage of the shank while it prevents the withdrawal of the head. Intermediate the portions 14 15 of the opening, conveniently immediately adjacent to the former, is a contracted portion 16, preferably of less width than the diameter of the shank of the stud. Surrounding the opening is a flange 17, projecting from the concave side and adapted to extend through one of the elements to be fastened together and be bent over or upset on the opposite side to force the material into the concavity of the plate, thus attaching this member of the fastener firmly in place. The upsetting of the flange produces about the eyelet-opening a rounded edge or breast 18.

In the use of the device the two members are secured in the manner previously described to the two elements to be fastened together, these elements being shown in Figs. 1 and 2 as pieces of fabric F or the like. To fasten the members, the head of the stud is inserted through the portion 14 of the opening, and the shank is then drawn into the slot 15, the contracted portion 16 yielding under the pressure applied to allow the passage of the shank and then resuming its normal position to lock the stud within the slot until sufficient pressure is applied to again separate the walls of the contracted portion and permit the withdrawal of the stud through the portion 14 of the opening. It is evident that if the walls of the eyelet-opening were formed by the edges of a simple perforation in a plate so that the line of thrust of the stud in passing through the contracted portion of the opening was directly against the edge thereof, and therefore through the body of the plate, said plate would necessarily have to be narrow to allow proper resiliency, and this would not leave sufficient width of stock for secure attachment, particularly when used upon thin fabrics, from which it would be liable to pull out. On the other hand, if such a plate were left of any appreciable width the yield of this contracted portion would be rather by the crushing or distortion of the metal, and this, after a limited number of operations, would render the opening at 16 normally wider than the shank, so that the locking effect would be lost. In my improved fastener the stress does not fall upon the body of the plate, but upon the comparatively thin flange, which may readily be sprung laterally without permanent distortion. Moreover, the yieldability is increased by the fact that the curved wall is in itself resilient, and even if there were no yield of the flange as a whole the inner portion of this breast would compress under the pressure of the shank and thus furnish the elastic stop therefor. It will be seen that when the stud is within the slot 15 there is a movement of the members permitted relatively to each other by the play of said stud between the contracted portion 16 and the end wall of the eyelet-opening. This does away with the direct strains tending always to effect disengagement and also prevents the dragging upon the garment which might cause the fastener to show or even tear out of lighter fabrics.

In the form of my fastener illustrated in Fig. 5 the stud member is the same as that hereinbefore described, while the eyelet member E' is particularly adapted for attachment to thinner and more delicate goods. Its flange 18 may be of less height than that of E, and after it has been passed through the material the plate 19, having an opening into which the flange fits, may be slipped over it and the upper edge of said flange upset to bind the fabric F or other material between this plate 19 and the main plate 20.

Having thus described my invention, I claim—

1. A fastener comprising a stud member and an eyelet member, the stud member having a shank and an enlarged head and the eyelet member including a plate provided with an opening surrounded by a flange, said opening having a portion sufficiently large to admit the head, a narrower portion permitting the passage of the shank and an intermediate portion normally of less width than the diameter of the shank, the flange at said intermediate portion serving both to attach the eyelet member and as a yielding stop for the stud member.

2. A fastener comprising a stud member and an eyelet member, the stud member having a shank and an enlarged head and the eyelet member consisting of the plate provided with an opening surrounded by a flange, said flange being adapted to extend through one of the elements to be fastened together and be upset on the opposite side, and said opening between the walls of the flange having a portion sufficiently large to admit the head, a narrow portion normally permitting the passage of the shank and an intermediate portion of less width than the diameter of the shank, the flange at said intermediate portion being capable of yielding laterally upon the passage of the shank.

3. A fastener comprising a stud member and an eyelet member, the stud member having a shank and an enlarged head and the eyelet member consisting of a plate provided with an opening surrounded by a flange, said flange being adapted to extend through one of the elements to be fastened together and be upset on the opposite side to form a rounded edge, and said opening between the rounded edge of the flange having a portion sufficiently large to admit the head, a narrower portion permitting the passage of the shank and an intermediate portion normally of less width than the diameter of the shank, the rounded flange at said intermediate portion being capable of yielding bodily and of compression upon the passage of the shank.

4. A fastener comprising a stud member and an eyelet member, the stud member having a shank and an enlarged head and the eyelet member consisting of a plate concaved on one side and provided with an opening surrounded by a flange projecting from the concave side, said flange being adapted to extend through one of the elements to be fastened together and be upset to force a portion of the element into the concavity of the flange, and said opening between the walls of the flange having a portion sufficiently large to admit the head, a narrower portion permitting the passage of the shank and an intermediate portion normally of less width than the diameter of the shank.

LAWRENCE W. LUELLEN.

Witnesses:
ARTHUR BECKERSON,
BENJ. B. DEWING.